Patented Dec. 22, 1953

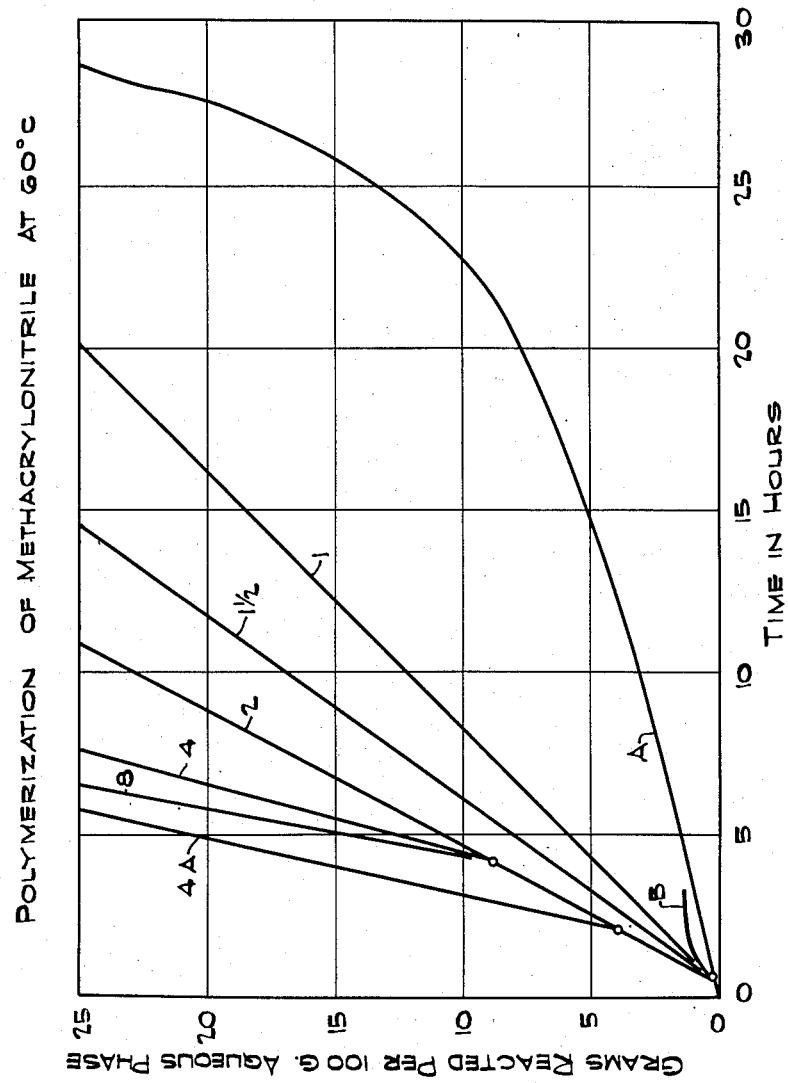

2,663,701

UNITED STATES PATENT OFFICE 2,663,701

PROCESS FOR POLYMERIZING CERTAIN UNSATURATED COMPOUNDS IN AN AQUEOUS SYSTEM

Gezà S. Rónay, Oakland, and Jerome R. Vinograd, Berkeley, Calif., assignors to Shell Development Company, Emeryville, Calif., a corporation of Delaware Application July 23, 1951, Serial No. 238,068

14 Claims. (Cl. 260—85.5)

This invention relates to a process for polymerizing polymerizable unsaturated organic compounds. More particularly, the invention relates to an improved process for polymerizing certain ethylenically unsaturated organic compounds in an aqueous system.

Specifically, the invention provides a novel process for homopolymerizing and copolymerizing substantially water-insoluble ethylenically unsaturated organic compounds having a molecular weight below 225 at a rapid rate in an aqueous system which comprises dissolving the desired monomer in an aqueous medium containing water and a water-soluble polymerization catalyst in an amount which is insufficient to form a seperate organic layer, maintaining the resulting mixture under polymerizing conditions, and, after a small part of the monomer, and preferably at least about one-fourth of the initially dissolved monomer, has been polymerized and in the presence of the formed polymer, continuously or intermittently adding monomer to the reaction mixture at a rate in excess of the rate at which the monomer is initially polymerized, said rate of addition being insufficient to form a separate organic phase in the reaction mixture.

As a special embodiment, the invention provides a preferred method of conducting the above-described process in a continuous manner wherein the initial rate of addition of the monomer is maintained at a rate in excess of the initial rate at which the monomer is polymerized up to about the two times the initial rate of polymerization without forming a separate organic layer until at least about two times the initial amount of monomer has been polymerized and then the rate is increased to about 2.5 to 8 times the said initial rate of polymerization without forming a separate organic phase, and then the polymer is subsequently removed from the reaction mixture at such a rate that there is always sufficient polymer in the reaction mixture to support the increased rate of addition.

This application is a continuation-in-part of our application Serial No. 17,806, filed March 29, 1948, now abandoned.

It is known that polymerizable unsaturated compounds, such as acrylonitrile, may be polymerized in an aqueous system. The general method for conducting this type of polymerization comprises dissolving the monomer in water containing a water-soluble polymerization catalyst so as to form a saturated solution therewith, heating the mixture to polymerize the dissolved monomer, and removing the polymer substantially as fast as it is formed. If conducted on a continuous basis, the monomer would be added to the reaction mixture at the rate at which the monomer was initially being polymerized and the polymer would be removed as fast as it was being formed. This type of process is an improvement over the known bulk and emulsion polymerization processes in that it avoids the use of contaminating emulsifying agents and coagulating agents, and produces the polymers in finer and more workable form.

The aqueous polymerization processes known heretofore, however, are not entirely satisfactory for use on a large commercial scale. In most cases, the polymerizable unsaturated monomers have only slight solubility in water, and to obtain a practical yield of polymer it is necessary to employ excessively large reaction chambers. Thus, in the case of methacrylonitrile which has a very low solubility in water it would require a reaction chamber capable of holding over 1000 parts of water just to obtain a polymer yield of about 20 parts per operation.

It is an object of the invention, therefore, to provide an improved process for polymerizing substantially water-insoluble unsaturated organic compounds in an aqueous system. It is a further object to provide a process for polymerizing certain substantially water-insoluble ethylenically unsaturated organic compounds in an aqueous system which is able to produce high yields of polymer in relatively small reaction vessels. It is a further object to provide a process for polymerizing substantially water-insoluble ethylenically unsaturated organic compounds having a molecular weight below 225 in an aqueous system at a very rapid rate. It is a further object to provide a process for polymerizing the above-described monomers in an aqueous system that is more economical and practical for large scale operations than many of the prior known polymerization processes. It is still a further object to provide an aqueous polymerization process that is ideally suited for use in preparing relatively homogeneous copolymers from the above-described monomers. It is a further object to provide a method for preparing polymers having improved physical properties. It is still a further object to provide an improved process for polymerizing substantially water-insoluble alpha,beta-ethylenically unsaturated nitriles in an aqueous system. Other objects and advantages of the invention will be apparent from the following detailed description thereof.

It has now been discovered that substantially water-insoluble ethylenically unsaturated organic compounds having a molecular weight below 225 can be homopolymerized or copolymerized in an aqueous medium at a very rapid rate in a relatively small reaction chamber by the novel process of the invention comprising dissolving the desired monomer in an aqueous medium in an amount which is insufficient to form a separate organic layer, maintaining the resulting mixture under polymerizing conditions, and after a small quantity of monomer, and preferably at least about one-fourth of the amount of initially dissolved monomer, has been polymerized and in the presence of the formed polymer, continuously or intermittently adding the monomer to the reaction mixture at a rate in excess of the rate at which the monomer is initially polymerized, said rate of addition being insufficient to form a separate organic phase in the reaction mixture. The process is preferably conducted on a continuous basis wherein the initial rate of addition of monomer is maintained at a rate in excess of the rate at which the monomer is initially being polymerized up to about two times the initial rate of polymerization until at least about two times the initial amount of monomer has been polymerized and then the rate of addition is increased to about 2.5 to 8 times the initial rate of polymerization without forming a separate organic phase, and the polymer is removed from the reaction mixture at such a rate that there is always sufficient polymer in the reaction mixture to support the increased rate of addition. The process of the invention is superior to the known aqueous polymerization processes in that it accomplishes the polymerization at a much faster rate and avoids the use of the excessively large reaction vessels. In addition, the polymers obtained therefrom have better quality, particularly as to their strength, flexibility and color, than the polymers obtained from many of the known commercial polymerization processes.

The above-described process of the invention is based on the unexpected discovery that the presence of the polymers of the above-described substantially water-insoluble monomers in the aqueous system enables that system to tolerate more monomer without forming a separate organic layer. Thus, if some of the polymer is retained in the system after it has been formed therein, one is able to increase the rate of addition of monomer far above the initial rate that could be tolerated without forming a separate organic phase.

The above-noted discovery and the operation of the process of the invention can be illustrated by reference to the accompanying graph. Line A represents the course of the polymerization of methacrylonitrile at 60° C. in the presence of potassium persulfate in an aqueous emulsion. As indicated by the curve, it takes over 30 hours to obtain 25% polymer. Line B represents the polymerizing methacrylonitrile in an aqueous system, i. e. wherein methacrylonitrile is dissolved in water containing potassium persulfate and the mixture heated at 60° C. While the initial rate of polymerization is quite rapid, e. g. about 1.2 parts per hour per 100 parts of water, it rapidly decreases as the monomer is consumed. When this latter-described aqueous polymerization process is conducted on a continuous basis, i. e. wherein the monomer is added at a rate which is equal to the initial rate of polymerization of the monomer, the polymerization continues at the initial rate and the course of the polymerization is shown by line 1. When operated in this manner, 25% polymer could be obtained in about 20 hours.

As indicated above, it has been surprisingly found that after a small quantity of polymer has been formed in the aqueous system, the rate of addition of the monomer can be increased above the rate at which the monomer is initially being polymerized without forming a separate organic layer. Thus, in the case of methacrylonitrile, after about one-fourth of the initial monomer has been polymerized, the rate of addition can be increased to two times the initial rate of polymerization. The course of this polymerization is illustrated by line 2 in the accompanying graph. In this case, 25% polymer can be obtained in about 11½ hours. If larger amounts of polymer are allowed to accumulate in the reaction mixture, the rate of addition can then be increased to much higher values. Thus, as shown in the accompanying graph by line 8, after 9 parts of polymer have accumulated, the rate of addition can be increased to about 8 times the initial rate of polymerization without forming a separate organic phase. In this case, the 25% polymer can be obtained in about 6½ hours.

The monomers to be polymerized or copolymerized by the process of the invention comprise the substantially water-insoluble ethylenically unsaturated organic compounds having a molecular weight below 225. The expression "substantially water-insoluble," as used throughout the specification and claims in relation to the monomers to be polymerized, refers to those monomers which have at least some solubility in water so that some of the monomer may enter the aqueous medium but still have so little solubility in water that they are regarded as being relatively water-insoluble. Preferably, the monomers have a solubility in water at room temperatures of from 0.1 part to 18 parts per 100 parts of water. Particularly preferred monomers are those having a solubility of from 0.5 part to 14 parts per 100 parts by weight of water.

The expression "ethylenically unsaturated," as used throughout the specification and claims, refers to those monomers possessing one or more polymerizable $>C=C<$ group in their molecule. Examples of such monomers having the required molecular weight below 225 include maleic acid, maleic acid esters of alcohols containing from 1 to 8 carbon atoms, tetrahaloethylene, butadiene - 1,3,3 - dimethylbutadiene - 1,3, piperylene, isoprene, chloroprene, styrene, alpha-methylstyrene, dichlorostyrene, vinyl phenol; the esters of unsaturated acids, such as acrylic acid and the alpha-alkyl substituted acrylic acids, such as alpha-butyl acrylic acid, and alpha-methyl acrylic acid, such as methyl acrylate, methyl methacrylate, butyl methacrylate, and propyl acrylate; the vinylidene halides such as vinylidene chloride and vinylidene bromide; the vinyl esters of inorganic acids such as the halogen acids, and hydrocyanic acid, as vinyl chloride, vinyl bromide, acrylonitrile, and methacrylonitrile; the vinyl esters of the monocarboxylic acids, such as vinyl acetate, vinyl caproate, vinyl chloroacetate, vinyl benzoate, and vinyl valerate; the vinyl esters of the polycarboxylic acids, such as divinyl succinate, divinyl adipate, vinyl allyl phthalate, and vinyl methyl glutarate; the vinyl esters of the unsaturated acids such as vinyl acrylate, vinyl crotonate, and vinyl methacrylate; the vinyl ethers such as vinyl ethyl ether, vinyl butyl ether, and vinyl allyl ether, and vinyl ketones such as vinyl butyl ketone, and vinyl ethyl ketone.

Preferred monomers to be polymerized or copolymerized by the process of the invention comprise the vinylidene monomers containing a polymerizable $CH_2=C<$ group and no other polymerizable group, such as vinyl chloride, vinyl acetate, vinyl butyrate, vinylidene chloride, styrene, methyl styrene, butyl acrylate, methyl methacrylate, allyl acetate, allyl butyrate, acrylonitrile, methacrylonitrile, isobutylene, and the like.

Particularly preferred monomers to be polymerized or copolymerized are the ethylenically unsaturated nitriles, particularly the alpha,beta-ethylenically unsaturated aliphatic nitriles, such as acrylonitrile, methacrylonitrile, alpha-ethyl acrylonitrile, alpha-butyl acrylonitrile, alpha,-beta-dimethyl acrylonitrile, alpha-(2-chlorobutyl) acrylonitrile, alpha-bromobutyl acrylonitrile, and the like.

Also coming under special consideration, particularly because of the final quality of polymers that may be produced therefrom, are the unsaturated esters of the aliphatic acids which contain a polymerizable ethylenic linkage in either the acid or alcohol portion of the molecule, such as methyl acrylate, methyl methacrylate, vinyl acetate, vinyl butyrate, allyl acetate, allyl valerate, allyl caproate, hexyl acrylate, and vinyl chloroacetate. Preferred esters of this group comprise the esters of the open-chain aliphatic monocarboxylic acids containing from 1 to 8 carbon atoms and the monohydric aliphatic alcohols containing from 1 to 6 carbon atoms.

The above-described monomers may be employed in the process singly, in admixture with another or in combination with other polymerizable materials in a variety of proportions.

According to the process of the invention, the above-described monomer or monomers are first dissolved in an aqueous medium containing water and a water-soluble polymerization catalyst. The catalysts employed may be any of the water-soluble polymerization catalysts, such as persulfuric acid, peracetic acid, percarbonic acid, perphosphoric acid, perphthalic acid, the persalts, such as potassium persulfate, the peresters, such as tert.-butyl perbutyrate, ditert.-butyl dipermalonate and O,O-tert.-butyl O-ethyl monopermalonate, the peroxides, such as hydrogen peroxide, acetyl peroxide, succinyl peroxide, and sodium peroxide. Preferred catalysts are the members of the group consisting of persulfuric acid, perphthalic acid, percarbonic acid and perphosphoric acid and their water-soluble salts, preferably their sodium and potassium salts. If desired, mixtures of these catalysts may also be employed.

The amount of the catalyst to be utilized in the aqueous medium may vary over a considerable range depending upon various factors, such as the type of monomer to be polymerized, desired temperature to be employed, etc. In most cases the amount of catalyst will vary between .01% to about 5% by weight of the material being polymerized. A preferred amount of catalyst will vary between .01% and 2% by weight.

Accelerators or adjacent catalysts, such as sodium bisulfite, may also be added to the aqueous medium. Modifiers such as plasticizers, stabilizers, lubricants, dyes, pigments and fillers having some solubility in water may also be included in the aqueous phase. If such modifiers chemically react with or otherwise adversely affect the polymerization process, they may be added following polymerization. The nature and amount of such modifiers will depend upon the particular type of monomer being polymerized and the type of product desired.

The amount of monomer initially added to the aqueous medium should be below that which gives rise to the formation of a separate monomer layer. Preferably the amount added will be that which forms a saturated solution. As the monomers used in the process have only limited solubility in water, the amount of monomer that can be initially tolerated in the aqueous medium will be relatively small. Thus, in the case of methacrylonitrile, only about 2 parts per 100 parts of water and, in the case of acrylonitrile, only about 8 parts per 100 parts of water can be added without forming a separate layer. While it is obviously desirable to completely saturate the aqueous medium with the monomer, the process can and in some cases preferably is operated with the initial addition of much smaller amounts, e. g. amounts varying from 20% to 95% of that required to saturate the aqueous medium.

The monomer or monomers are polymerized in the aqueous medium by means of the aforedescribed catalysts and/or the application of heat or ultraviolet light. Temperatures employed in the polymerization will vary over a considerable range depending upon the monomer or monomers selected and the particular polymerization catalyst contained in the said medium. In most cases the temperature will vary between 20° C. and 150° C., with a preferred range being between 50° C. and 80° C. Higher or lower temperatures may be employed, however, if desired or necessary. Superatmospheric, atmospheric or subatmospheric pressures may be employed during the polymerization.

According to the process of the invention, the monomer is continuously or intermittently added to the reaction mixture any time after the monomer dissolved in the aqueous medium has started to polymerize. The point at which the monomer begins to polymerize will depend upon the nature of the monomer and the particular polymerization conditions employed, and it can best be determined for each individual case by a few routine determinations. In most instances, there will be a short induction period of about 10 minutes to 30 minutes before the polymerization commences.

Of course, if the initial aqueous medium was not completely saturated with the monomer at the start of the process, it is within the scope of the present invention to start the addition of the monomer at the very beginning of the process so as to bring the solution to the saturation level.

The rate at which the monomer is added to the reaction mixture will be expressed in the specification and appended claims in terms of the initial rate of polymerization of the dissolved monomer, i. e. the maximum rate at which the monomer dissolved in the aqueous medium would be polymerized under the intended conditions without the addition of a further quantity of monomer. The initial rate of polymerization of the various monomers can best be determined by a few routine experiments wherein the monomer is polymerized under the desired conditions and the amount of polymer formed is plotted against time.

As indicated above, after the polymerization starts the monomer can be added at the initial rate of polymerization without forming a separate organic phase. The present invention, however, is concerned with employing a rate of addition in excess of the initial rate of polymerization. The amount that the rate can be increased over the initial rate of polymerization will depend upon the amount of polymer that has been allowed to accumulate in the reaction mixture before the increased rate is commenced. Generally, it may be said that the amount of the increase will vary proportionally with the length of time before the addition and with the amount of polymer contained in the reaction mixture. If the addition is started only a short period after the polymerization has started and the amount of formed polymer is relatively small, the increased rate can be only slightly in excess of the initial rate of polymerization. After a larger quantity of polymer has been formed, e. g. after about .25 to .5 or .75 to 1.2 times the initially dissolved monomer has been polymerized, then the rate can be increased to a greater extent, e. g. about 1.5 to 2 times the initial rate of polymerization without forming the separate organic phase. However, during the early stages of the process, e. g. when only up to about 2 times the amount of the initially dissolved monomer has been polymerized, the increase cannot be too excessive without forming a separate organic phase. In the case of methacrylonitrile, for example, in the early stages of the process, the increase cannot be much in excess of 2 times the initial rate of polymerization without forming a separate organic phase.

It is preferred to increase the rate of addition only to a small extent during the early stages, as indicated above, and continue the addition at this rate until a large amount of polymer has been formed, e. g. until about 2 to 3 times the initial amount of monomer dissolved in the aqueous medium has polymerized, and then increasing the rate of addition from about 2.1 to 4 times the initial rate of polymerization. If the increase in rate is delayed until still larger quantities of polymer have accumulated, e. g. until about 4 to 6 times the initial amount of monomer has polymerized, then the rate can be increased to about 5 to 8 times the initial rate of polymerization without forming the separate organic layer in the reaction mixture.

Of course, it should be understood that the rate of adding the monomer need not be increased above the initial rate of polymerization until the later stages of the process but the rate may be maintained at or below the initial rate of polymerization for some time after the polymerization has started and then the rate may be increased above the initial rate of polymerization. This method, however, is much less to be preferred than the above-described method wherein the rate of addition is gradually increased above the initial rate of polymerization during the early stages of the process.

After the rate of addition of the monomer has been increased, as indicated above, it can be held constant, decreased or increased as the amount of the polymer increases. When the process is operated as a batch process, i. e. when the polymer is retained in the reaction chamber until the end of the process, it is desirable to continue to increase the rate as far as possible without forming a separate organic layer. When operating in such a manner, the rate may be increased up to about 10 or 12 times the initial rate of addition without causing a separate organic layer to appear. In many cases, however, without the removal of some of the polymer, the system becomes difficult to control and it is desirable to stop the reaction and remove some of the polymer or to revert to a continuous method of operation as indicated below.

When operating in a continuous manner, the process is conducted as indicated above with the exception that, after the desired amount of polymer has been formed, a portion of the polymer is then continuously removed and the process continued as before. In operating in this manner, enough polymer should always be retained in the reaction chamber to support the desired increase in the addition of the monomer. The amount of polymer retained is preferably at least equal to that corresponding to ½ of the initial monomer dissolved in the aqueous medium. More preferably, the amount of polymer retained may vary from 1.5 to 15 times, and still more preferably from 4 to 12 times, the amount of polymer corresponding to the initially dissolved monomer. It is also preferred to delay removing the polymer until the amount of polymer in the mixture is substantially, e. g. 2% to 5%, in excess of that required to be retained in the reaction mixture as indicated above. Water and catalyst are preferably added with the monomer, or in separate portions, to the reaction mixture to make up for that withdrawn with the portion of polymer latex.

The rate at which the polymer is removed may vary over a considerable range. It is preferred to remove the polymer at such a rate as to maintain the above-noted amount of polymer in the reaction mixture, i. e. the polymer is removed at about the same rate at which it is then being formed in the reaction mixture. More preferably, the polymer removed per hour will vary from that corresponding to 2 times to 5 times the amount corresponding to the initially dissolved monomer.

After the process has been made continuous, the rate of addition of the monomer may be increased, decreased or maintained constant as required to avoid formation of a separate organic layer. In most cases, however, it will be desirable to maintain the rate of addition at a constant level.

A particularly preferred method for conducting the process of the invention in a continuous manner comprises dissolving the desired monomer in the aqueous medium, heating the resulting mixture to a polymerizing temperature and, after a small part of the monomer and preferably at least about one-fourth of the initially dissolved monomer has polymerized and in the presence of that polymer, continuously adding monomer at a rate in excess of the initial rate at which the monomer is polymerized up to about two times the initial rate of polymerization without forming a separate organic layer until at least about two times the initial amount of monomer has been polymerized, and then increasing the rate up to about 2.5 to 8 times the said initial rate of polymerization without forming a separate organic phase, and subsequently, after a considerable amount of polymer, e. g. from 4 to 12 times that corresponding to the initially dissolved monomer, has been accumulated, removing the polymer at such a rate that there is always sufficient polymer in the mixture to support the increased rate of addition, water and catalyst being added to make up for that withdrawn with the polymer latex.

The introduction of the monomer throughout the process may be intermittent or continuous. The monomer is preferably added in a continuous manner but in some cases it may be desirable to add the monomer in small quantities at fixed periods, e. g. every 5 to 10 minutes.

The process of the invention may be conducted in the presence or absence of air, but it is preferably conducted in the absence of air, e. g. in the presence of an inert gas such as nitrogen.

A special application of the above-described process is in the production of copolymers having a relatively homogeneous composition. In the conventional copolymerization process, the dissimilar monomers are combined at the beginning of the process and the resulting mixture subjected to polymerization to completely polymerize the monomers. As each of the dissimilar monomers differs in the rate in which it enters the reaction, and as the ratio of units of the monomers contained in the copolymer is dependent upon the particular ratio of monomers present in the mixture at the moment of formation of the copolymer, it is apparent that the mixture of monomers in these processes will be constantly changing in composition during the course of the copolymerization. As a consequence of this constant change in composition, the copolymer molecules produced at the first part of the process will contain a different ratio of units of the dissimilar monomers from the ratio contained in the copolymer molecules produced at a later time, and the resulting product will be composed of a series of materials having varying ratios of monomer units therein, i. e. the copolymers will have a non-homogeneous composition.

This difficulty is eliminated when the process of the invention is employed in the production of the copolymers. When the rate of addition of the mixture of monomers is maintained at a substantially constant rate, such as is the case in the above-described preferred method for conducting the process on a continuous basis, and when the monomers are added in a ratio in which they are consumed in the reaction mixture, the ratio of monomer concentrations in the reaction mixture will be substantially the same at all times and in all parts of the reaction mixture so that the copolymers prepared therefrom will have a homogeneous composition.

The polymers and copolymers formed in the above-described process of the invention are substantially insoluble in water and gradually settle out from the aqueous reaction mixture as a relatively colorless, finely divided solid. The polymers and copolymers may be separated from the reaction mixture by any suitable means such as filtration, centrifugation, extraction, and the like.

The polymers and copolymers produced by the process of the invention in most cases will have a relatively high molecular weight. In addition, the polymers will possess improved strength, flexibilty and milling properties over polymers produced by the prior known polymerization processes. When completely polymerized, the products of the invention may be made into sheets, rods, tubes, films, filaments, fibers and the like. Their increased strength and flexibility make them readily adaptable for use in the production of buttons, knobs, table coverings, containers, household decorations, etc. In a molten state or in a solvent solution, they may be utilized in the production of single-sheet or multiple-layer laminates of cloth, wood, paper, and the like. The polymers may also be utilized to advantage in the manufacture of paints, enamels, lacquers, and as plasticizers, lubricants, textile assistants, and the like.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example I*

About 2 parts of methacrylonitrile were added to 100 parts of water containing 1 part of potassium persulfate so as to form a homogeneous mixture therewith. This mixture was then stirred and heated to about 60° C. for 40 minutes until about ¼ to ½ of the monomer had polymerized, and then under the same conditions fresh monomeric methacrylonitrile was slowly added to the reaction mixture at about twice the initial rate of polymerization, i. e. at the rate of about 2.4 parts of monomer per hour, the initial rate of polymerization being about 1.2 parts per hour per 100 parts of water. The addition of the monomer was so regulated as to insure that no separate monomer phase was formed in the reaction mixture. At the end of 10 hours of operation, about 24 parts of polymer had been collected. (Line 2 shown in the accompanying graph.)

*Example II*

The process described in Example I was repeated with the exception that, after about 9 parts of polymer had been formed (4 hours after the start of the process), the rate of adding the monomer was increased to 4 times the initial rate of polymerization, i. e. to 4.8 parts per hour. At the end of 7 hours' operation, about 24 parts of polymer had been collected. (Line 4 in the accompanying graph.)

*Example III*

The process described in Example I was again repeated with the exception that after 9 parts of polymer had been formed, the rate of adding the monomer was increased to 8 times the initial rate of polymerization, i. e. to 9.6 parts per hour. At the end of about 5¾ hours of operation, about 23⅓ parts of polymer had been collected. (Line 8 in the accompanying graph.)

*Example IV*

The process described in Example I was again repeated with the exception that after about 4 parts of polymer had been formed, the rate of adding the monomer was increased to about 4 times the initial rate of polymerization, i. e. to 4.8 parts per hour. At the end of about 5 hours of operation, about 24 parts of polymer had been collected. (Line 4A in the accompanying graph.)

*Example V*

About 2 parts of methacrylonitrile were added to 100 parts of water containing 1 part of potassium persulfate so as to form a homogeneous mixture therewith. This mixture was then stirred and heated to about 60° C. for 40 minutes until about ¼ to ½ of the monomer had polymerized, and then methacrylonitrile was slowly added to the reaction mixture at twice the rate at which the monomer was initially polymerized, i. e. at the rate of about 2.4 parts per hour. The addition was continued at this rate until about 9 parts of polymer were formed and then the rate of addition was increased to about 9.6 parts per hour. After about 22.4 parts of polymer had collected (5.83 hours of operation), the rate of adding the monomer was reduced to about 4.8 parts per hour and the latex withdrawn at a rate corresponding to this rate of polymer formation, i. e. about 3.9 parts every 5 minutes. The amount of catalyst solution added to make up for that withdrawn with the latex amounted to about 3.2 parts every 5 minutes. After about 5 more hours of operation, about 46 parts of polymer had been collected.

Molded samples of the polymer prepared in the above-described process had a clear color, heat distortion point of 93° C., flexural strength of 22,000 p. s. i., and impact strength of 0.36. A similar molded sample prepared from an emulsion polymer had a hazy yellow color, low heat distortion point of 78° C., flexural strength of 8,500 p. s. i., and impact strength of 0.22.

Other homopolymers having improved physical properties are obtained by employing the following monomers in place of methacrylonitrile in the above-described process: alpha-ethyl acrylonitrile, alpha-butyl acrylonitrile, and butyl methacrylate.

Example VI

The process described in the preceding example was repeated with the exception that monomer was added to the reaction mixture at the rate of 2.4 parts per hour until about 4 parts of polymer had collected, and then the rate of adding the monomer was increased to about 4.8 parts per hour. After about 22.4 parts of polymer had been formed, the polymer was withdrawn at about the rate at which it was then being formed and the monomer addition was continued at substantially the same rate. Water and catalyst was added with the monomer to make up for that withdrawn with the polymer. After about 4 more hours of operation, about 41 parts of polymer had been collected.

Example VII

Monomeric acrylonitrile was added to 100 parts of water containing 1 part of potassium persulfate to form a saturated solution. After heating the mixture at 60° C. for 50 minutes, fresh acrylonitrile was added at a rate of about 1.2 times the initial rate of polymerization, care being taken not to form a separate organic layer in the reaction mixture. After about 12 parts of polymer had been formed, the rate of introducing the monomer was increased to about 3 times the initial rate of polymerization. When about 20 parts of polymer had been formed, polymer was withdrawn from the reaction mixture at the same rate at which it was then being formed. An aqueous solution of catalyst and water was added to make up for that withdrawn with the polymer. At the end of 7 hours, a 92% yield of polymer had been collected.

Example VIII

Monomeric methyl methacrylate was added to 100 parts of water containing 1 part of potassium persulfate until a saturated solution was obtained. This mixture was then heated at 50° C. for about 30 minutes, and then under the same conditions monomeric methyl methacrylate was continuously added to the reaction mixture at a rate of about 2 times the initial rate of polymerization. After about 10 parts of polymer had been formed, the rate was increased to about 4 times the initial rate of polymerization. After about 20 parts of polymer had been formed, the polymer was withdrawn at about the same rate at which it was then being formed. At the end of 7 hours, a 98% yield of methyl methacrylate had been obtained. The resulting polymer had excellent color, strength and flexibility.

Example IX

A mixture of 40 parts of acrylonitrile and 60 parts of vinyl acetate was added to 100 parts of water containing 1 part of potassium persulfate so as to form a saturated solution therewith. This mixture was then heated at 65° C. for about 40 minutes, and then under the same conditions a mixture of 40 parts of acrylonitrile and 60 parts of vinyl acetate was continuously added to the reaction mixture at about the rate at which the monomers were initially copolymerized. After about 15 parts of polymer had collected, the rate of addition of the monomer mixture was increased to about 4 times that of the previous rate. At the end of 10 hours, a 95% yield of copolymer was obtained.

Example X

A homogeneous copolymer of allyl acetate and styrene was prepared in the following manner. A mixture containing allyl acetate and styrene was added to 100 parts of water containing 1 part of potassium persulfate so as to form a saturated solution therewith. This mixture was then heated at 65° C. for about 40 minutes, and then under the same conditions a mixture of allyl acetate and styrene in the mole ratio of 1:1 was continuously added to the reaction mixture at about 2 times the initial rate at which the monomers were copolymerized without forming a separate organic layer. After about 15 parts of polymer had collected, the rate of addition of the monomer mixture was increased to about 3 times that of the previous rate and held at that rate for the rest of the polymerization. Analysis of the copolymer collected at the end of the process indicated that it had substantially the same composition as the mixture of monomers added during the process, i. e. a ratio of styrene and allyl acetate units of 1:1.

We claim as our invention:

1. In a process for polymerizing an ethylenically unsaturated organic compound having a molecular weight below 225 and a solubility in water varying from some solubility to not more than 18 parts per 100 parts of water at room temperature wherein the said compound is dissolved in an aqueous medium containing water and a water-soluble polymerization catalyst in an amount which is insufficient to form a separate organic layer and the mixture is maintained at a polymerizing temperature, the improvement which comprises after at least one-fourth of the monomer initially dissolved in the aqueous medium has been polymerized and in the presence of the formed polymer adding monomer over a period of time to the reaction mixture at a rate which is at least twice the initial rate of polymerization, said addition never being sufficient to cause the formation of a separate organic layer in the reaction mixture.

2. A continuous process for polymerizing an ethylenically unsaturated organic compound having a molecular weight below 225 and a solubility in water varying from some solubility to not more than 18 parts per 100 parts of water at room temperature which comprises dissolving the said compound in an aqueous medium containing water and a water-soluble polymerization catalyst in an amount which is insufficient to form a separate organic layer, maintaining the resulting mixture at a polymerizing temperature and after about one-fourth of the amount of monomer initially dissolved in the aqueous medium has polymerized and in the presence of the formed polymer continuously adding the monomer to the reaction mixture at a rate which is at least twice the rate at which the monomer is initially polymerized at the beginning of the process, which rate is insufficient to form a separate organic layer in the reaction mixture, and subsequently withdrawing a portion of the polymer formed at such a rate that there is always sufficient polymer in the reaction mixture to support the increased rate of addition of monomer.

3. A process for polymerizing an ethylenically unsaturated organic compound having a molecular weight below 225 and a solubility in water varying from some solubility to not more than 18 parts per 100 parts of water at room temperature which comprises dissolving the said unsaturated compound in an aqueous medium containing water and a water-soluble peroxide polymerization catalyst so as to form a homogeneous solution therewith, maintaining the resulting mixture at a polymerizing temperature and after about at least one-fourth of the monomer initially dissolved in the aqueous medium has been polymerized and in the presence of the formed polymer adding continuously the monomer to the reaction mixture at a rate which is 2 times the rate at which the monomer is initially polymerized, which rate is insufficient to form a separate organic layer, until at least about 2 times the initially dissolved monomer has been polymerized and then in the presence of that polymer increasing the rate of addition to 2.1 to 8 times the initial rate of polymerization, which new rate is insufficient to form a separate organic layer.

4. A process for polymerizing an ethylenically unsaturated organic compound having a molecular weight below 225 and a solubility in water varying from 0.1 to 18 parts per 100 parts of water at room temperature which comprises dissolving the said unsaturated compound in an aqueous medium containing water and a water-soluble peroxide catalyst so as to form a homogeneous solution therewith, maintaining the resulting mixture at a polymerizing temperature between 20° C. and 100° C., continuously adding the unsaturated compound to the reaction mixture at a rate which is not in excess of the rate at which the initially dissolved monomer polymerizes and after at least one-fourth of the monomer initially dissolved in the aqueous medium has been polymerized and in the presence of the formed polymer increasing the rate of addition of the monomer above about two times the initial rate of polymerization, said increased rate of addition being insufficient to form a separate monomer layer.

5. A continuous process for copolymerizing at least two ethylenically unsaturated organic compounds having a molecular weight below 225 and a solubility in water varying from 0.1 part to 18 parts per 100 parts of water at room temperature which comprises dissolving the desired mixture of monomers in an aqueous medium containing water and a peroxide water-soluble polymerization catalyst so as to form a homogeneous solution therewith, maintaining the resulting mixture at a polymerizing temperature, after at least one-fourth of the initially dissolved monomers has been polymerized and in the presence of the formed polymer continuously adding a mixture of the dissimilar monomers at a rate which is two times the rate at which the monomers were initially polymerizing but still insufficient to form a separate organic layer, and after about 1.5 to 4 times the initial amount of monomer has polymerized increasing the rate of addition of the monomers to at least about 4 times the rate at which the monomers were initially polymerized, said increased rate of addition being insufficient to form a separate monomer layer, and subsequently withdrawing the polymer at about the rate at which it is then being formed in the reaction mixture, water and polymerization catalyst being added with the monomers to make up for that withdrawn with the polymer.

6. The process as defined in claim 5 wherein the monomers are acrylonitrile and vinyl acetate.

7. The process as defined in claim 5 wherein the monomers added after part of the initial monomer has polymerized as well as the monomers added after the rate has increased are being added to the reaction mixture in the ratio in which they are being consumed in the reaction mixture.

8. A process for polymerizing an unsaturated organic compound having a single $CH_2=C=$ group, a molecular weight below 225 and a solubility in water varying from 0.1 to 18 parts per 100 parts of water at room temperature which comprises adding the unsaturated compound to an aqueous medium containing water and an oxygen-yielding water-soluble polymerization catalyst, maintaining the resulting mixture at a polymerizing temperature between 20° C. and 100° C., and after about one-fourth to one-half of the monomer initially dissolved in the reaction mixture has been polymerized and in the presence of the formed polymer continuously adding the monomer to the reaction mixture at a rate which is 2 times the rate at which the monomer is initially polymerized, which rate is insufficient to form a separate organic layer until at least twice the amount of the initially dissolved monomer has polymerized and then increasing the rate of addition to between 2.1 and 8 times the initial rate at which the monomer was polymerized, said new rate of addition being insufficient to bring about the formation of a separate organic layer in the reaction mixture.

9. A process as defined in claim 8 wherein the unsaturated compound is an alpha,beta-ethylenically unsaturated nitrile.

10. A process as defined in claim 8 wherein the unsaturated compound is methyl methacrylate.

11. A process as defined in claim 8 wherein the unsaturated compound is acrylonitrile.

12. A process for polymerizing methacrylonitrile which comprises dissolving that monomer in an aqueous medium containing a water-soluble peroxide polymerization catalyst so as to form a homogeneous solution therewith, heating the resulting mixture to a polymerizing temperature between 40° C. and 100° C., and after about one-fourth to one-half of the monomer initially dissolved in the aqueous medium has been formed and in the presence of that formed polymer continuously adding methacrylonitrile at a rate of at least 2.4 parts per hour per 100 parts of water, said rate of addition being insufficient to bring about the formation of a separate organic layer in the reaction mixture.

13. A continuous process for polymerizing methacrylonitrile which comprises dissolving that monomer in an aqueous medium containing 0.1% to 5% by weight of a water-soluble peroxide catalyst so as to form a homogeneous solution therewith, heating the resulting mixture to a polymerizing temperature between 40° C. and 80° C., and after about one-fourth to one-half of the monomer initially dissolved in the aqueous medium has been formed and in the presence of that formed polymer continuously adding methacrylonitrile at a rate 2.4 parts per hour per 100 parts of water without forming a separate monomer phase until the amount of polymer formed in the reaction mixture is at least about 4 times that which could be theoretically obtained from the monomer initially dissolved in the aqueous medium and then increasing the rate of addition to between 4.8 and 9.6 parts per hour per 100 parts of water without forming a separate monomer phase, and subsequently removing the polymer at a rate between about 5 parts to about 10 parts per hour per 100 parts of water, care being taken to insure that sufficient polymer is always retained in the reaction mixture to support the rate of addition of monomer then being employed without forming a separate monomer phase.

14. In a process for polymerizing a polymerizable ethylenically unsaturated organic compound having a molecular weight below 225 and a solubility in water that varies from some solubility to no more than 14 parts per 100 parts of water at room temperature wherein the said compound is dissolved in an aqueous medium containing water and a water-soluble polymerization catalyst, the amount of the compound being insufficient to form a separate monomer layer, and the resulting mixture is maintained at a temperature between 20° C. and 100° C., the improvement which comprises after at least one-fourth of the monomer initially dissolved in the aqueous phase has been polymerized and in the presence of the formed polymer adding the ethylenically unsaturated organic compound over a period of time to the reaction mixture at a rate which is at least twice the initial rate of polymerization, said addition never being sufficient to cause the formation of a separate monomer layer in the reaction mixture.

GEZÀ S. RÓNAY.
JEROME R. VINOGRAD.

References Cited in the file of this patent
UNITED STATES PATENTS

| Number | Name | Date |
|---|---|---|
| 2,436,926 | Jacobson | Mar. 2, 1948 |